US011134079B2

(12) United States Patent
Rakshit et al.

(10) Patent No.: US 11,134,079 B2
(45) Date of Patent: Sep. 28, 2021

(54) COGNITIVE BEHAVIORAL AND ENVIRONMENTAL ACCESS (71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/417,776

(22) Filed: May 21, 2019

(65) Prior Publication Data
US 2020/0374283 A1 Nov. 26, 2020

(51) Int. Cl.
G06F 21/31 (2013.01)
G06F 21/30 (2013.01)
H04L 29/06 (2006.01)
G06K 9/00 (2006.01)
G06F 21/62 (2013.01)

(52) U.S. Cl.
CPC ...... H04L 63/0861 (2013.01); G06K 9/00369 (2013.01); H04L 63/0853 (2013.01); H04L 63/1433 (2013.01)

(58) Field of Classification Search
None
See application file for complete search history.

(56) References Cited

U.S. PATENT DOCUMENTS

| 5,381,602 | A | 1/1995 | Matzo et al. |
| 7,954,150 | B2 | 5/2011 | Croft |
| 2009/0043504 | A1 | 2/2009 | Bandyopadhyay |
| 2015/0120465 | A1* | 4/2015 | Baldwin ............ H04L 63/1466 705/14.67 |
| 2015/0154453 | A1* | 6/2015 | Wilf ........................ G06K 9/46 382/103 |

(Continued)

OTHER PUBLICATIONS

Secure and reliable patient body motion based authentication approach for medical body area networks. Yessad. Elsevier. (Year: 2017).*

(Continued)

Primary Examiner — Venkat Perungavoor
(74) Attorney, Agent, or Firm — Erik C. Swanson (57) ABSTRACT In an approach, a computer identifies a user attempting to access information that requires authentication approval via a computing device. The computer receives one or more digital images from the computing device. The computer determines a current field of view of the computing device based on the received one or more digital images. The computer determines a current location of the user. The computer determines a current posture of the user. The computer determines whether at least one of the current field of view, the current location, and the current posture during a current attempt to access information matches one or more of a previous field of view of the computing device, a previous location of the user, and a previous posture of the user during a previous attempt to access the information. Based on the determination, the computer performs an action related to the user accessing the information.

20 Claims, 3 Drawing Sheets (56) References Cited

U.S. PATENT DOCUMENTS

| | | |
|---|---|---|
| 2015/0264572 A1 | 9/2015 | Turgeman |
| 2016/0085802 A1 | 3/2016 | Rios, III |
| 2018/0300540 A1* | 10/2018 | Swisher ............. G06K 9/00362 |
| 2019/0238727 A1* | 8/2019 | Yachida ................. G03B 17/02 |

OTHER PUBLICATIONS

A biometric authentication model using hand gesture images. Fong. BioMed Central. (Year: 2013).*

Video-based signature verification and en-grasping posture analysis for user-dependent identification authentication. Cheng. IET ComputVis. (Year: 2012).*

Assentication: User De-authentication and Lunchtime Attack Mitigation with Seated Posture Biometric. Kaczmarek. Springer. (Year: 2018).*

Human Identification From Freestyle Walks Using Posture-Based Gait Feature. Khamsemanan. IEEE. (Year: 2018).*

* cited by examiner

COGNITIVE BEHAVIORAL AND ENVIRONMENTAL ACCESS

BACKGROUND

The present invention relates generally to the field of security, and more particularly to online access security from personal devices.

Authentication is the act of confirming the truth of an attribute that is claimed to be true by an entity or individual. For example, the identity of a person is confirmed by validating identification documents such as a driver's license or passport, while a website is verified through a digital certificate. Authentication may fall into one of three categories that include, information possessed by the individual (e.g., personal knowledge, password, pin number, challenge response, etc.), an item in possession of the individual (e.g., identification card, access card, security token, badge, etc.), and inherent aspects of the individual (e.g., fingerprint, retinal pattern, biometric identifier, etc.). Authentication can include both single-factor authentication and multi-factor authentication. Single factor authentication only requires one of the aforementioned categories to be successfully validated regarding the individual to allow access. Multi-factor authentication requires at least two of the aforementioned categories to be successfully validated in order to grant access to the individual (e.g., password and an access card, access card and fingerprint, etc.)

Electronic authentication (e.g., digital authentication, e-authentication) establishes a confidence in the identity of the individual that is presented to an information system (e.g., computer based information system). Similarly, electronic authentication utilizes one or more factors to establish confidence in an identity of an individual (i.e., a knowledge factor, a possession factor, and a biometric factor). Electronic authentication systems may utilize multiple methods such as a token (i.e., a device an individual possesses and controls that authenticates identity), passwords and pin numbers, a public-key (i.e., public and private key pair), symmetric-key authentication, Short Message Service (i.e., individual receives a message and enters provided information from the message back into the system), biometrics, and digital identity (e.g., characteristics or data attributes linked to digital identifiers such as an e-mail, uniform resource locator, or domain name). For example, electronic identification (eID) provides digital solutions that identify individuals and organizations in which electronic identity credentials bind a name or other attributes to a token and performs authentication through Proof of Possession (PoP).

SUMMARY

Aspects of the present invention disclose a method, computer program product, the method comprises one or more computer processors identifying a user attempting to access information that requires authentication approval via a computing device. The method further comprises one or more computer processors receiving one or more digital images from the computing device. The method further comprises one or more computer processors determining a current field of view of the computing device based on the received one or more digital images. The computer determines a current location of the user. The method further comprises one or more computer processors determining a current posture of the user. The method further comprises one or more computer processors determining whether at least one of the current field of view, the current location, and the current posture during a current attempt to access information matches one or more of a previous field of view of the computing device, a previous location of the user, and a previous posture of the user during a previous attempt to access the information. Based on the determination, the method further comprises one or more computer processors performing an action related to the user accessing the information.

DETAILED DESCRIPTION

Embodiments of the present invention recognize that applications accessed through a user device require multiple levels of authentication based upon contextual factors. For example, in order to access a bank account through a web based application, different levels of authentication may be needed depending on whether the user device through which access is requested is a recognized registered device versus a new non-registered device. Embodiments of the invention recognize that authentication can be falsified and access can be obtained despite different levels of authentication. For example, a password may be compromised if not securely stored, answers to challenge questions may be discovered, physical devices (e.g., token, pass cards, etc.) may be lost or stolen, and biometrics may be replicated. Furthermore, users may choose to disable additional levels of authentication if perceived to be inconvenient or cumbersome. Embodiments of the present invention monitor, analyze, and store the behavior of the user locations, and field of view at the time a user access an application. Embodiments of the present invention learn over time the manner in which the user performs particular tasks on devices with regards to position and orientation within a precise micro-location. Furthermore, embodiments of the present invention derive a pattern for the user for each application accessed, and determine whether future access attempts are consistent with derived patterns to determine access, restrictions to implement, and whether additional levels of authentication are necessary to gain full access.

Figure 1:
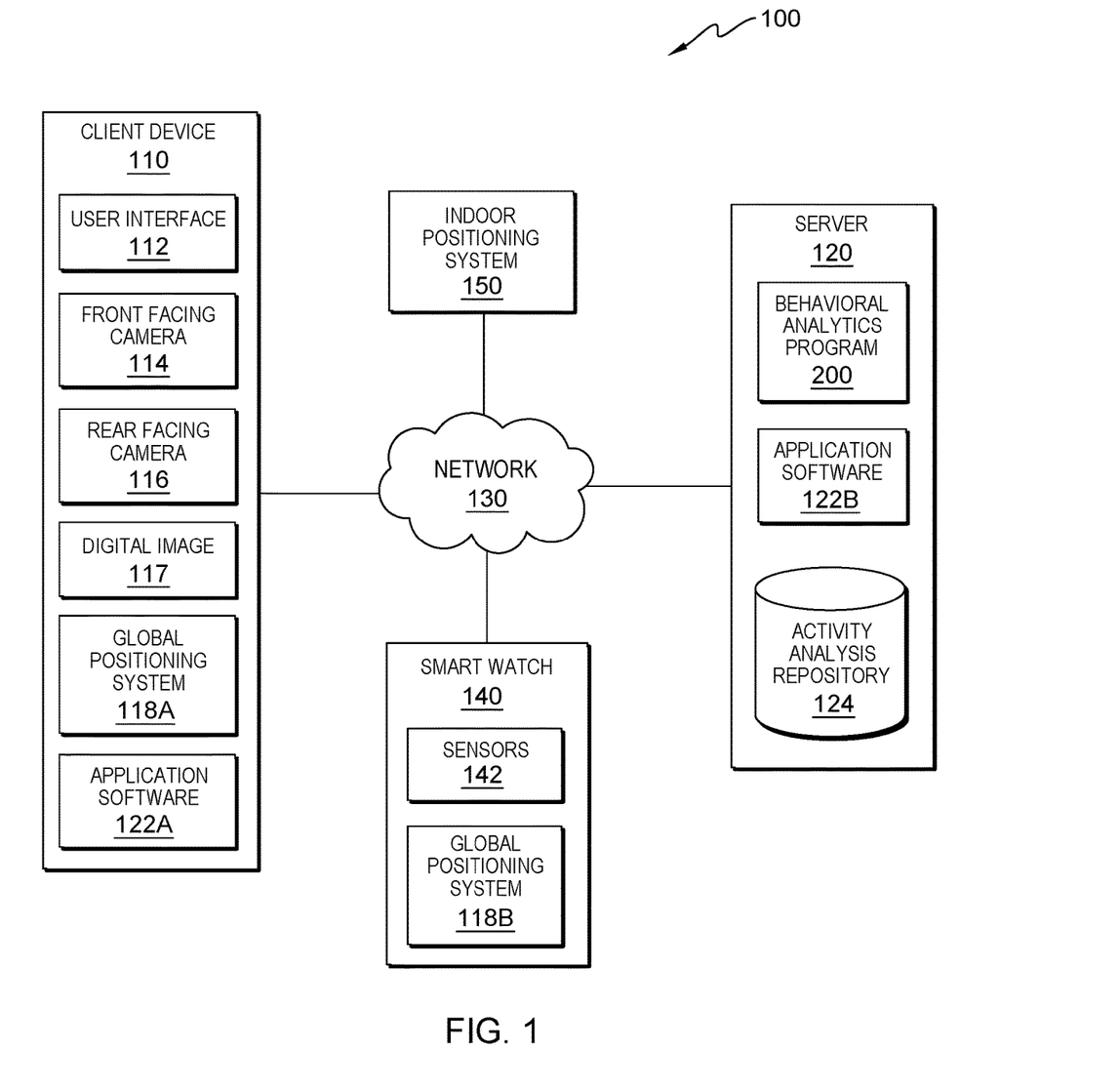
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one embodiment and does not imply any limitations with regard to the environments in which different embodiments may be implemented.

In the depicted embodiment, distributed data processing environment 100 includes client device 110, server 120, indoor positioning system 150, and smart watch 140 interconnected over network 130. Distributed data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112, front facing camera 114, rear facing camera 116, digital image 117 global positioning system 118A, and application software 122A.

User interface 112 is a program that provides an interface between a user of client device 110 and a plurality of applications that reside on client device 110 (e.g., application software 122A, interface to utilize front facing camera 114 and/or rear facing camera 116, etc.) and/or may be accessed over network 130 (e.g., application software 122B). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 receives information from the user, front facing camera 114, and rear facing camera 116 based on application software 122A or application software 122B. User interface 112 sends the collected information and receives information and responses through application 122A to and from behavioral analytics program 200.

Front facing camera 114 and rear facing camera 116 are digital cameras that capture photographs in digital memory. Front facing camera 114 (e.g., webcam, selfie camera etc.) is a digital camera installed in client device 110 such that the camera is installed on the front surface (e.g., display side, screen side) of client device 110 facing towards the user and allows interactions to occur through user interface 112. For example on a mobile phone (e.g., client device 110), front facing camera 114 is installed on the front surface with the display screen, which allows the user to see the display and view the live preview of the image (e.g., digital camera display screen acts as a view finder), while also allowing interactions with user interface 112. Rear facing camera 116 is a digital camera installed in client device 110 in which the lens faces away from the user. For example, on the mobile phone, rear facing camera 116 is installed on the back cover of the mobile phone and does not allow the user to view a live preview. Front facing camera 114 and rear facing camera 116 reside on client device 110. Front facing camera 114 and rear facing camera 116 create digital image 117. Digital image 117 (e.g., photographs, images, video feed) are series of pixels (e.g., picture elements) utilizing a Red-Green Blue (RGB) system to color each pixel, that form a captured image based on the field of view (FOV) of front facing camera 114 and/or rear facing camera 116. In the depicted embodiment, digital image 117 reside on client device 110. In another embodiment, digital images reside on server 120. Front facing camera 114 and rear facing camera 116 send digital image 117 to behavioral analytics program 200 for analysis. Behavioral analytics program 200 analyzes digital image 117 to determine posture and field of view of the user utilizing client device 110. Behavioral analytics program 200 stores and the results of the analysis, which includes insights (e.g., probabilities, trends, and patterns of behavior derived from compounding historical data that pertains to application software 122A for the user that is based on, and includes the field of view, the posture, and the location for future comparisons) of digital image 117 in activity analysis repository 124. In some embodiments, digital image 117 are also stored in activity analysis repository 124 for future analysis and comparison.

Global positioning system 118A and global positioning system 118B are GPS receivers that are part of a satellite based radio-navigation systems that includes ground stations, satellites, computers, and receivers. Determination of the latitude and longitude of Earth bound receivers (e.g., global positioning system 118A and global positioning system 118B) occurs by calculating the time difference for signals to from at least three different satellites to reach the same earth bound receiver. Global positioning system 118A and global positioning system 118B locate multiple satellites and calculate a distance to each satellite in order to determine location though three dimensional trilateration (i.e., determine absolute or relative locations of points by measurement of distances using spheres). Global positioning system 118A and global positioning system 118B reside on client device 110 and smart watch 140 respectively. Global positioning system 118A and global positioning system 118B send and receive information to and from behavioral analytics program 200.

Application software 122A and application software 122B are a set of one or more programs designed to carry out the operations for a specific application to assist a user to perform an activity (e.g., word processing programs, spread sheet programs, media players, web browsers, digital camera software, web based applications, application to access a remote system, etc.). Application software 122A is a mobile application, which is an installed program designed to operate on client device 110 to a performing a specific set of tasks. Application software 122B is a web based application accessed over the Internet based on entering a uniform resource locator (URL) into a web browser through which access is granted (e.g., user enters a URL within a web browser on client device 110 to access a web portal). A web portal is a location on the Internet that is unique and accessed based on a specific URL similarly to a website, however, a web portal is login protected and user-specific. In the depicted embodiment, application software 122A and application software 122B reside on client device 110 and server 120 respectively. In another embodiment, application software 122A and application software 122B may reside smart watch 140 or on another device (not shown) connected over network 130.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains application software 122B, activity analysis repository 124, and behavioral analytics program 200.

Activity analysis repository 124 stores the results of analyzing digital image 117 (e.g., position data, field of view, user posture, movement, view of the surroundings, etc.), application data (e.g., name of application software, URL, date, access time, etc.), and location data (e.g., precise location of client device 110 based on global positioning system 118A, global positioning system 118B, and/or indoor positioning system 150). Activity analysis repository 124 grows over time as the user accesses application software 122A in subsequent sessions (e.g., behavioral analytics program 200 continues to add entries and expands knowledge pertaining to user behavior). In some embodiments, activity analysis repository 124 stores a copy of digital image 117 for future comparison. Activity analysis repository 124 resides on server 120. In another embodiment, activity analysis repository 124 may reside on client device 110 or on another device (not shown) connected over network 130.

Network 130 may be a local area network (LAN), a wide area network (WAN) such as the Internet, a wireless local area network (WLAN), any combination thereof, or any combination of connections and protocols that will support communications between client device 110, server 120, indoor positioning system 150, smart watch 140, and other computing devices and servers (not shown), in accordance with embodiments of the inventions. Network 130 may include wired, wireless, or fiber optic connections.

Smart watch 140 is a portable wearable computing device designed to be worn on a wrist (e.g., wristwatch). Additionally, smart watch 140 includes functionality such as, but not limited to, providing notifications, access to applications, media management, answering message, fitness tracking (e.g., heart rate, vital signs, sleep, position, speed, activity level, pedometer, etc.), and global positioning data (e.g., global positioning system 118B). Additionally, smart watch 140 includes customized user specific information (e.g., wrist location of smart watch 140, stride length, physical activity data, heart rate, sleep schedule, etc.). Smart watch 140 includes sensors 142 and global positioning system 118B. Sensors 142 may include optical sensors, accelerometers, gyroscopes, and compass sensors. Optical sensors shine a light on the skin of the wearer to illuminate capillaries. The optical sensor measures the rate at which blood is being pumped through the capillaries, and thus determines a heart rate. An accelerometer tracks movement in each direction through the rate of change of the velocity. For example a 3-axis accelerometer measures the acceleration in three directions (e.g., x-axis, y-axis, and z-axis). Gyroscopes measure orientation and rotation (e.g., angular velocity) through a micro-electro-mechanical system (MEMS). The gyroscopic sensors are oscillating components, incorporated similarly to an integrated circuit, from which acceleration and direction change are detected. The vibration of the oscillating component vibrates within a plane until a deviation is detected as a result of a Corolis force, and the deviation translates to the rotational component. A compass sensor is a digital compass based on a magnetometer (i.e., magnetic sensor that measures magnetism), which provides a simple orientation in relation to the Earth's magnetic field discerning north, from which the remaining cardinal directions (e.g., east, south, and west) can be extrapolated. Smart watch 140 sends and receives information to and from client device 110, indoor positioning system 150, and behavioral analytics program 200.

Indoor positioning system 150 locates objects, people within a building (e.g., store, venue, public service building, etc.), and/or designated areas through collection of sensory information. Client device 110 collects lights, radio waves, magnetic fields, acoustic signals, and/or other sensory information from indoor positioning system 150 to determine a location (e.g., precise micro-location). In one embodiment, indoor positioning system 150 relies on distance measurements from client device 110 to nearby anchor nodes (e.g., locates and tags nodes with known positions, providing ambient locations to be sensed), magnetic positioning (e.g., measures and maps magnetic disturbances to represent a building's floor plan), and dead reckoning (e.g., calculates a current position based on a previous position by advancing that position with known or estimated speeds over an elapsed time and course). In another embodiment, indoor positioning system 150 is a wireless indoor positioning system that applies a localization technique by measuring the intensity of a received signal strength indicator (RSSI) associated with wireless access points (not shown) or client device 110. Additionally, indoor positioning system 150 accesses a database to correlate mobile device global positioning system location data with the Media Access Control (MAC) addresses of the wireless access points or client device 110, thus providing a geo-location of the associated wireless access point. Indoor positioning system 150 determines a precise location associated with client device 110 and/or smart watch 140. Indoor positioning system 150 sends and receives position data associated with the user of client device 110 and/or smart watch 140 to and from behavioral analytics program 200.

Behavioral analytics program 200 is a program that determines whether to allow or restrict access and/or functionality to application software 122A and/or application software 122B based on confidence levels (e.g., percentage of correlations between current values and expected values) determined from postural, positional, and field of view attributes associated with an activity. Behavioral analytics program 200 monitors activity performed on client device 110. Behavioral analytics program 200 collects postural, positional, and field of view attributes associated with the activity from client device 110, front facing camera 114, rear facing camera 116, global positioning system 118A, and software application 122A. Additionally, behavioral analytics program 200 collects postural and positional information from smart watch 140 and indoor positioning system 150. Behavioral analytics program 200 correlates the postural, positional, and field of view attributes of the current activity (e.g., request to access a banking application) with stored instances of postural, positional, and field of view attributes for activities (e.g., previously performed activities) that are stored within activity analysis repository 124. Behavioral analytics program 200 determines whether to allow access, restrict access, or issue a challenge prior to allowing a level of access based on determining a confidence level associated with the correlations. Behavioral analytics program 200 resides on server 120. Behavioral analytics program 200 sends and receives information to activity analysis repository 124, application software 122B, smart watch 140, indoor positioning system 150, and client device 110 (e.g., user interface 112, digital image 117, global positioning system 118A, and application software 122A).

In some embodiments, authentication may require a single factor or multiple factors. Factors for authentication can include: passwords, email addresses, location, a specific computing device, challenge questions, inputting received numbers and/or letters, postural, positional, field of view attributes, etc. Each of the described can equate to a factor utilized for authentication. In some embodiments, multiple of the described are required in combination for a single factor for authentication. For example, a user name and a password are required for a single factor. In another example, a geographic location is one factor and a time of day is another factor. In various embodiments, multiple factors are required to gain access to information. For example, a username is one factor and the field of view attributes of a computing device is another factor. In some embodiments, if one factor is not available for use, another factor may be substituted when required to access information. In some embodiments, different levels of access require additional factors of authentication.

Figure 2:
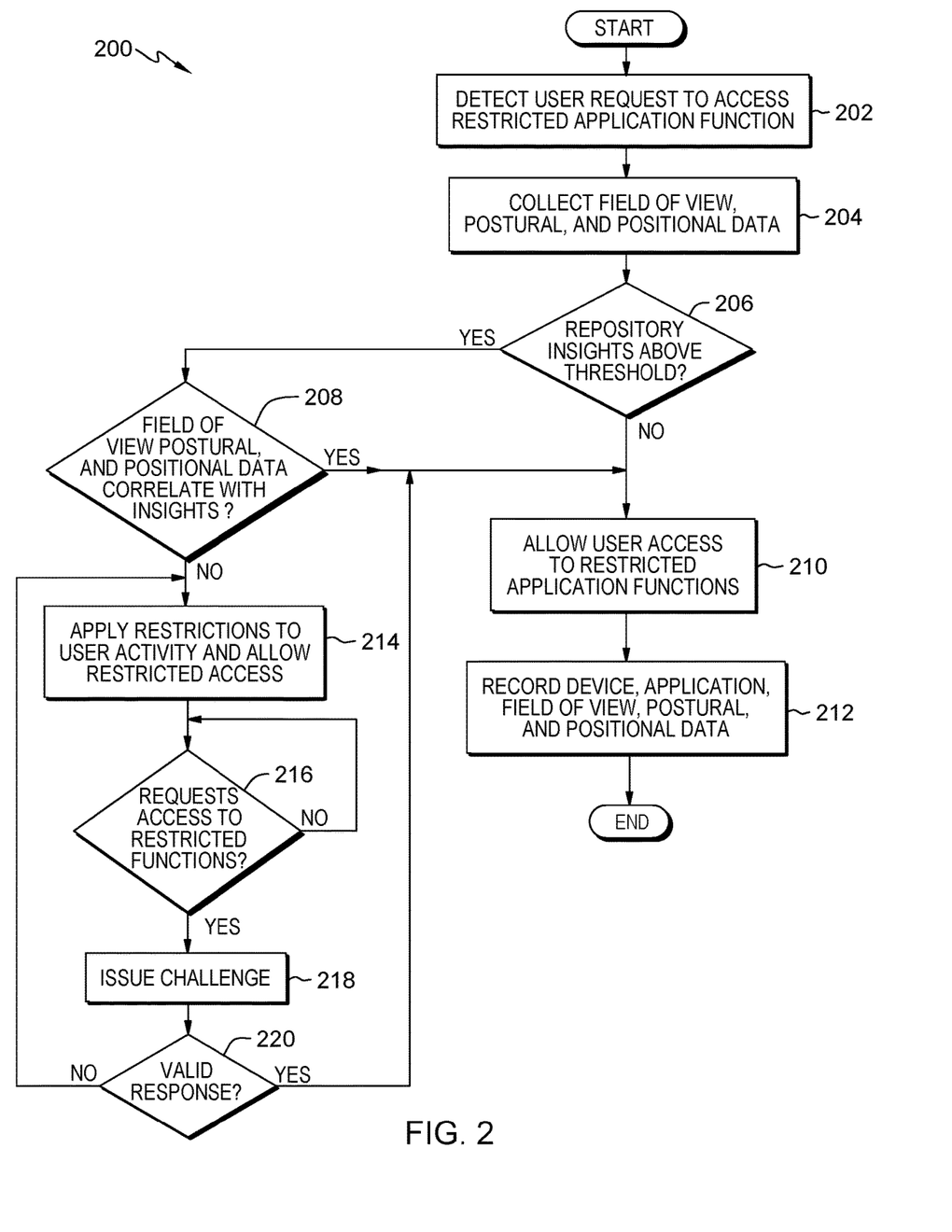
FIG. 2 is a flowchart depicting operational steps of a behavioral analytics program, on a proxy server computer within the data processing environment of FIG. 1, for monitoring and correlating user device activity to postural, positional, and field of view (FOV) attributes in order to determine whether access and/or restrictions to web and application services are granted to a user in accordance with an embodiment of the present invention.

FIG. 2 is a flowchart depicting operational steps of a behavioral analytics program 200 for monitoring and correlating user activity on client device 110 associated with postural, positional, and field of view attributes in order to determine whether access and/or restrictions to web and application services are granted to a user in accordance with an embodiment of the present invention.

The present invention may contain various accessible data sources, such as digital image 117, that may include personal storage devices and content the user wishes not to be used, behavioral analytics program 200 allows the user to opt in or opt out of exposing personal information. Behavioral analytics program 200 enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

In one embodiment, behavioral analytics program 200 initiates as a background program (i.e., a program the runs without intervention from a user performing tasks independently) and collects user activity data based on the criteria established by behavioral analytics program 200. In another embodiment, behavioral analytics program 200 initiates as part of application software 122A or application software 122B (e.g., software indicates authentication protocols and behavioral analytics program 200 initiates). For example, application software 122A is a banking application that provides allows the user to perform transactions (e.g., view a balance, pay a bill, transfer funds, order checks, replace lost credit cards, etc.). As the banking application provides access to financial information regarding the user, the user's access to the account and ability to perform transactions necessitates authentication.

In step 202, behavioral analytics program 200 detects a user request to access a restricted application function of application software 122A via user interface 112. In one embodiment, behavioral analytics program 200 detects the user opens application software 122A installed on client device 110 (e.g., mobile application is an installed program designed to operate on client device 110 to perform a specific set of tasks) and initiates. In another embodiment, behavioral analytics program 200 detects a user enters a URL that opens application software 122B through a web browser and initiates. In one embodiment, behavioral analytics program 200 detects that the user enters a user name and password to access an account and/or selects a restricted function (e.g., selects to delete information from an account, alter contents of a file or program that is protected and requires authentication prior to completing the requested task). In another embodiment, behavioral analytics program 200 determines application software 122A is a program that does not utilize a login and login credentials however, the user requests a restricted function. To access the restricted function, behavioral analytics program 200 requests the user enter a passcode, a phrase, and/or confirms removal of the restriction prior to unlocking the function within application software 122A. For example, a document is write protected with a password, therefore the document is read only until the user enters a password to obtain access to editing functions. Behavioral analytics program 200 collects activity performed on client device 110 associated with application software 122A or application software 122B. For example, on client device 110, behavioral analytics program 200 may include a behavioral analytics engine, which records activity and operations performed regarding applications that are launched (e.g., provides utilization information to form insights). Behavioral analytics program 200 stores recorded activity as activity occurs for further analysis and for incorporation into activity analysis repository 124.

In step 204 behavioral analytics program 200 collects field of view, postural, and positional data. In an embodiment, behavioral analytics program 200 receives digital image 117 from front facing camera 114. Behavioral analytics program 200 receives a field of view of the area surrounding the user from a forward facing perspective (e.g., visual perspective from another user that is facing the user, head to head, view of an area that is behind the user). Additionally, behavioral analytics program 200 receives additional instances of digital image 117 from rear facing camera 116. Behavioral analytics program 200 receives a field of view that encompasses the surrounding area in front of the user (e.g., forward view as seen by the user, view that is in front of the user, view that is away from the user). For example, the user holds client device 110 such that front facing camera 114 is directed towards the face of the user, whereas rear facing camera 116 is installed on the back of client device 110, and therefore, is directed away from the user. Behavioral analytics program 200 receives digital image 117 that pertain to the surroundings next to and behind the user of client device 110 based on the field of view.

In one embodiment, behavioral analytics program 200 performs image processing (i.e., utilizes computer algorithms and mathematical operations to identify a set of characteristics or parameters related to digital image 117) to identify objects that comprise the surroundings (e.g., objects that are visually seen within the field of view). In another embodiment, behavioral analytics program 200 performs a computer image analysis that includes pattern recognition, digital geometry, and signal processing (e.g., 2D and 3D object recognition, image segmentation, facial recognition, etc.) to identify surroundings. In some other embodiments, behavioral analytics program 200 performs object-based image analysis (OBIA), which utilizes processes that segment and classify pixels within the image into groups (e.g., homogeneous objects) to identify surroundings. The homogeneous objects can have different shapes and scales and include associated statistics (e.g., geometry, context, and textures), which cognitive image augmentation program 200 utilizes to classify the homogeneous objects within digital image 117. The surroundings provide a frame of reference (i.e., a set of criteria or stated values in relation to which measurements and/or judgements can be made) for the precise location of the user within a space from which behavioral analytics program 200 makes future comparisons (e.g., user compares the surroundings between a first and a second access, etc.). For example, the field of view from front facing camera 114 depicts the user in front of a brown cushion which partially obscures a yellow wall that intersects with a white ceiling and a partial view of a ceiling fan. The field of view from rear facing camera 116, depicts a cream carpet with running sneakers that are near an archway. The user accesses application software 122A a week later, and the field of view from front facing camera 114 again depicts the user in front of a brown cushion which partially obscures a yellow wall that intersects with a white ceiling and a partial view of a ceiling fan. Behavioral analytics program 200 determines the precise location is the same based on the similarity between surroundings by utilizing image processing and object recognition.

Behavioral analytics program 200 determines the posture of the user utilizing client device 110. In an embodiment, behavioral analytics program 200 receives and analyzes readings (e.g., measurements) from the accelerometer, gyroscope, and/or compass within client device 110. For example, behavioral analytics program 200 detects movements registered by the accelerometer, gyroscope, and/or compass, from which behavioral analytics program 200 determines that the user is holding client device 110. Conversely, if behavioral analytics program 200 determines that the accelerometer, gyroscope, and/or compass do not register movements, then behavioral analytics program 200 determines client device 110 is not held by the user (e.g., placed on a stationary surface). Additionally, behavioral analytics program 200 utilizes reference information from digital image 117 to further define the posture of the user. Behavioral analytics program 200 determines a position associated with client device 110 (e.g., laying face up or down on a flat surface, placed at an angle on a surface, held be the user). Behavioral analytics program 200 analyzes positions of objects within the field of view within digital image 117 relative to the focal point of the lenses of front facing camera 114 and rear facing camera 116. For example, utilizing a lens equation, behavioral analytics program 200 determines a focal length, a distance to an object, and a distance to the image. Behavioral analytics program 200 determines the position of client device 110 and/or the user by utilizing the calculated distances relative to the objects, a horizon line, the accelerometer (e.g., provides axis-based motion sensing), and the gyroscope (e.g., provides rotational information relative to the axis from which angles are derived, rotational component).

Additionally, behavioral analytics program 200 analyzes the position of objects within digital image 117 with data from client device 110 to determine a posture associated with the user. For example, behavioral analytics program 200 identifies the carpet and running sneakers within the field of view from rear facing camera 116 as items found on a floor. Behavioral analytics program 200 receives the gyroscope reading from client device 110, which based on the position of client device 110, indicates the carpet is the directed downward (e.g., back of client device 110 is facing down towards the floor) and that client device 110 is at a twenty degree angle, and the user and ceiling fan are located upwards. Behavioral analytics program 200 determines the hair of the user falls downward at a forward angle with a ceiling fan behind and above the user within the field of view of front facing camera 114. Behavioral analytics program 200 combines the information from the two perspectives of digital image 117 and determines that the user is leaning forward facing the floor at the 20 degree angle parallel to the front surface of client device 110.

Additionally, behavioral analytics program 200 receives information from smart watch 140 to further refine the position of the user. Smart watch 140 includes an sensors 142 (e.g., accelerometer, gyroscope, and compass sensors). Behavioral analytics program 200 receives a position of the user based on detected wrist movements that identify whether the user is laying down, sitting up, standing, or moving. For example, smart watch 140 includes an accelerometer that provides an acceleration force and measures orientation to determine whether smart watch 140 is horizontal, vertical, and/or moving. Additionally, if smart watch 140 includes a three-axis sensor, then behavioral analytics program 200 receives three dimensional positioning information (e.g., x-axis, y-axis, and z-axis). Behavioral analytics program 200 combines the data from client device 110 with smart watch 140 to determine a posture. For example, behavioral analytics program 200 determines the user is holding client device 110 based on minute movements associated with smart watch 140, and oscillations in digital image 117 that are synchronized with the minute movements of smart watch 140. Additionally, behavioral analytics program 200 determines the user is standing or sitting as the pedometer of smart watch 140 does not register steps as the accelerometer does not detect movement, the rotation of the gyroscope remains fixed, and the compass readings do not change. In some embodiments, smart watch 140 also includes an altimeter, barometer, or barometric altimeter that provide elevation data, which behavioral analytics program 200 utilizes to further assist in determining the position of the user (e.g., sitting versus standing still). In an alternate embodiment, behavioral analytics program 200 retrieves physical activity data, behavioral biometrics, and/or biometrics from smart watch 140 to create additional insights. For example, behavioral analytics program 200 records the heart rate of the user while the user performs actions. Behavioral analytics determines an average heart rate which provides a basis of comparison for subsequent access.

Behavioral analytics program 200 determines the location of the user based on the location of client device 110. In an embodiment, behavioral analytics program 200 determines an approximate location of the user based on global positioning system 118A or global positioning system 118B. For example, location services are disabled on client device 110 (e.g., location services are turned off, set to a power saving mode, limited functions due to low battery, etc.), behavioral analytics program 200 utilizes the location from global positioning system 118B from smart watch 140. For example a user of a GPS-enabled smart phone is outside with a clear line of sight (i.e., unobstructed view), and therefore, global positioning system 118A provides a location that is accurate up to 16 ft (i.e., 4.9 m). However GPS accuracy declines in lieu of satellite signal blockage (e.g., buildings, bridges, trees, etc.), indoor or underground use, and multipath (i.e., signals are reflected off buildings or walls). For example, a user is located within a house, and the GPS location from global positioning system 118A provides a location that encompasses the entire house rather than an exact location within the house.

In some embodiments, behavioral analytics program 200 refines the location provided by global positioning system 118A based on indoor positioning system 150 (e.g., client device 110 connects to indoor positioning system 150 to identify a precise micro-location). Behavioral analytics program 200 receives a precise micro-location from indoor positioning system 150 based on trilateration (i.e., determines location using ranges between multiple spatially separated locations with RSSI from multiple access points), fingerprinting (i.e., compares RSSI with recorded RSSI levels from access points in range with known coordinates), angle of arrival (i.e., antenna arrays of access points apply triangulation to calculate location), and/or time of flight (i.e., utilizes timestamps from wireless interfaces to estimate distance and relative position with respect to access points), to determine a precise location which can be accurate to within 65 cm. Behavioral analytics program 200 accesses a layout of the area from indoor positioning system 150 and applies the GPS location and the refined location from indoor positioning system 150 to identify the location of client device 110. Continuing the example, behavioral analytics program 200 accesses a map of the layout of the rooms within a house, and behavioral analytics program 200 determines the user is in the living room. Furthermore, behavioral analytics program 200 determines the user is sitting on a couch instead of a chair that is 2 ft away based on the refined position from indoor positioning system 150 (e.g., provides a precise location of the user). Behavioral analytics program 200 utilizes the field of view, posture, and location data to form insights (e.g., probabilities, trends, and patterns of behavior derived from compounding historical data that pertains to application software 122A for the user that is based on, and includes the field of view, the posture, and the location for future comparison).

In decision 206, behavioral analytics program 200 determines whether activity analysis repository 124 includes insights that are above a threshold (i.e., pre-defined or user defined condition that is met or exceeded in order for a result to occur). In other words, behavioral analytics program 200 determines whether activity analysis repository 124 includes insights that equate to a valid factor for authentication. In one embodiment, behavioral analytics program 200 determines two factor authentication is conditionally enabled (e.g., two factor authentication is utilized if behavioral analytics program 200 determines that the information for two factor authentication is entered and/or available, otherwise another factor will be required for access, or restricted access may be imposed). For example, behavioral analytics program 200 determines whether insights are above threshold, includes challenge information, and/or includes secure alternate means of communication to send a passcode.

In one embodiment, behavioral analytics program 200 determines the insights are above threshold (e.g., the information for two factor authentication is entered and/or available), and behavioral analytics program 200 determines whether the field of view, postural, and positional data correlates with the insights (decision 208). In another embodiment, behavioral analytics program 200 determines the insights are not above threshold, but determines challenge information is available, and behavioral analytics program 200 issues a challenge (step 218). Conversely, if behavioral analytics program 200 determines the information for two factor authentication is not entered or not available (e.g., with a new account, insights are not above threshold and challenge information is not yet created), then behavioral analytics program 200 reverts to single factor authentication. Behavioral analytics program 200 allows user access to restricted application functions based on entry of a valid authentication criteria (e.g., login id and password, entry of a passcode, etc.) from which behavioral analytics program 200 collects field of view, postural, and positional data to develop insights for authentication of future access attempts. In an alternate embodiment, behavioral analytics program 200 utilizes single factor authentication provided insights are above threshold and/or behavioral analytics program 200 receives a default insights from a user (e.g., user sets a preferred field of view, posture, and location at the time the account is created or prior to adding and/or invoking restrictions).

Behavioral analytics program 200 retrieves prior stored instances of application software 122A within activity analysis repository 124 that match the current instance of application software 122A. Behavioral analytics program 200 determines a total number of occurrences of each variation of an activity type that occurs relative to application software 122A. Behavioral analytics program 200 identifies instances within activity analysis repository 124 that match client device 110. Behavioral analytics program 200 identifies the instances within activity analysis repository 124 in which the field of view matches. Additionally, behavioral analytics program 200 further refines the insight selections, based on a precise location. Furthermore, behavioral analytics program 200 identifies matches within activity analysis repository 124 that match the posture of the user. Behavioral analytics program 200 compares the numbers of retrieved instances with a threshold (e.g., identifies a minimum number of occurrences from which a determination is made pertaining to access) to determine whether activity analysis repository 124 includes the minimum number of occurrences to make a determination pertaining to access. Behavioral analytics program 200 determines whether the remaining number of retrieved instances are above threshold to make further determinations. Additionally, behavioral analytics program 200 determines usage patterns and confidence levels that generate insights if behavioral analytics program 200 determines the number of occurrences are over a threshold. It should be appreciated that while the aforementioned steps of decision 206 are shown in a particular order to reduce the data set, the steps may occur in any order.

For example, a user accesses Bank ABC mobile application. Behavioral analytics program 200 retrieves all instances of access to Bank ABC mobile application which includes activities for paying a bill, balance inquiry, and transfer of funds between accounts. The user selected a balance transfer function to pay a bill. Behavioral analytics program 200 reduces the retrieved instances of insights to only stored instances that match balance transfers to pay a bill. Behavioral analytics program 200 identifies the user is accessing Bank ABC mobile application on a mobile phone instead of a tablet, and reduces the selections to only include the mobile phone. Behavioral analytics program 200 identifies current surrounding field of view of digital image 117 as depicting the user in a living room sitting on a blue piece of furniture. Behavioral analytics program 200 determines that activity analysis repository 124 includes insights for Bank ABC mobile application in which the field of view of user is associated with the living room, a kitchen, and an office. As the field of view in the current instance of digital images identifies the living room, behavioral analytics program 200 selects the insights associated with the living room in which the user is sitting on blue furniture. Within the insights field of views associated with the living room, behavioral analytics program 200 determines the insights include matches in which a couch and a recliner are both blue and have a similar field of view. Behavioral analytics program 200 compares the current precise location of the user with the precise location stored with the couch and the recliner. Behavioral analytics program 200 determines the current precise location matches with the precise location of the user in the recliner. Behavioral analytics program 200 determines whether the precise location also includes posture information, in which the user is either reclined or sitting (e.g., smart watch 140, analysis of FOV of image 117 from front facing camera 114 and/or rear facing camera 116, sensors within client device 110, etc.). Based on the posture data, behavioral analytics program 200 determines the user is reclined. Behavioral analytics program 200 retrieves the insights in activity analysis repository 124 that match the user sitting in the living room in the recliner and reclined for analysis.

In an alternate embodiment, if behavioral analytics program 200 determines that the threshold is not met based on client device 110, then behavioral analytics program 200 determines whether at least the application software 122A, the field of view, and the precise location are similar (e.g., difference in the precise location is equal to or less than 65 cm, difference in the precise location is less than or equal to a predefined tolerance, etc.). If behavioral analytics program 200 determines the application software 122A, the field of view, and the precise location are similar, behavioral analytics program 200 determines activity analysis repository 124 includes insights that are above a threshold based on a combination of device types. For example, a user sits in a chair at a kitchen table and connects to Bank ABC mobile application on a mobile phone ten times and from a tablet thirty times. The user connects to Bank ABC mobile application on the mobile phone, however behavioral analytics program 200 determines that the ten instances do not meet or exceed the threshold to determine insights. Behavioral analytics program 200 determines that the information associated with the table matches that of the mobile phone. Behavioral analytics program 200 combines the data sets to meet and/or exceed threshold to determine insights. In another example, application software 122A, the field of view, and the precise location are the same, however the posture is different (e.g., sitting upright instead of reclining). Additionally, behavioral analytics program 200 may determine client device 110 is also the same, and therefore combines the dataset to include all postures associated with client device 110, application software 122A, the field of view, and the precise location.

If behavioral analytics program 200 determines activity analysis repository 124 includes insights (e.g., historical field of view, posture, and location data that is associated with application software 122A for the user) that are above a threshold (decision 206, yes branch), then behavioral analytics program 200 determines whether the field of view, postural, and positional data correlates with the insights (decision 208). If behavioral analytics program 200 determines activity analysis repository 124 does not includes insights that are above threshold (decision 206, no branch), then behavioral analytics program 200 allows user access to restricted application functions (step 210). In an alternate embodiment, behavioral analytics program 200 may determine if challenge information is available, and in place of the insight data, behavioral analytics program 200 issues a challenge (step 218).

In decision 208, behavioral analytics program 200 determines whether the field of view, postural, and positional data correlates with the insights. The insights (e.g., patterns, trends, probabilities, etc. of behavior derived from compounding historical data that pertains to application software 122A for the user that is based on, and includes the field of view, the posture, and the precise micro-location) correlate occurrences of user activity associated with application software 122A and a manner in which the user performs the activities to a time, a location, and a position. For example, the GPS location is accurate to within 4.9 m, whereas the precise micro location is accurate to within 65 cm. Behavioral analytics program 200 utilizes the GPS location to identify that the user may be sitting anywhere on an entire couch, loveseat, or chair that is within the 4.9 meters in a living room. Conversely, the precise micro-location identifies a specific seat within the 4.9 meters such as the left most end cushion on the couch, thereby reducing the general location to a precise micro-location that is within 65 cm. Furthermore, the insights provide the basis for behavioral analytics program 200 to determine access based on similarities associated with the field of view, postural, and positional data that repeat between subsequent instances of access of application software 122A. Behavioral analytics program 200 determines probabilities based on the number of matches and repeat occurrences of insights within activity analysis repository 124 that are above threshold (e.g., creates confidence levels based upon trends within activity analysis repository 124). Behavioral analytics program 200 compares the current (e.g., live, real-time, etc.) field of view, postural, positional data with the field of view, postural, and positional data associated with the insights that are retrieved from activity analysis repository 124 (e.g., stored instances of the field of view, postural, and positional data that behavioral analytics program 200 records after the user successfully gains access to restricted functions in previous sessions that occur prior to the current access attempt). Behavioral analytics program 200 calculates a confidence level (e.g., probability that a parameter is within a specified range) associated with the current access attempt based on the comparison (e.g., identifies and assigns values based on variations and similarities). Behavioral analytics program 200 compares the confidence level to predefined settings to determine access. For example, to perform a banking function that changes the balance of the account (e.g., pays a bill, transfers funds, etc.) requires a confidence level of equal to or greater than 90%.

If behavioral analytics program 200 determines that the field of view, postural, and positional data correlates with the insights (decision 208, yes branch), then behavioral analytics program 200 allows user access to restricted application functions (decision 208). For example, a user pays a bill from a tablet while sitting reclined in a chair in the family room in which the field of view shows a television centered in front of the user. Behavioral analytics program 200 calculates a confidence level of 92% based on 25 observed instances of the user paying the bill, and therefore, allows the user access to proceed with paying the bill. If behavioral analytics program 200 determines that the field of view, postural, and positional data does not correlate with the insights (decision 208, no branch), then behavioral analytics program 200 applies restrictions to user activities and allows restricted access (step 214). For example, for balance transfers at Bank ABC, behavioral analytics program 200 does not identify a correlation between the posture of the user, the precise location, and the field of view (e.g., insights are not above threshold), and therefore, behavioral analytics program 200 restricts user access. In another embodiment, behavioral analytics program 200 may require another authentication metric rather than applying restrictions to user activity (e.g., performs step 218 prior to applying restrictions).

In step 210 behavioral analytics program 200 allows the user access to restricted application functions. In one embodiment, behavioral analytics program 200 determines the threshold is not met, and behavioral analytics program 200 grants access based on standard authentication (e.g., login and password match, security protocol for application software 122A is met, and unrestricted access is granted). Behavioral analytics program 200 allows access as at least one method of authentication is correctly entered, and thereby allows behavioral analytics program 200 to collect field of view, postural, and positional data to create insights for future access attempts. For example, the user performs balance inquiries at Bank ABC from home, at the office, while riding the subway, and from varying positions. Behavioral analytics program 200 is unable to identify a discernable correlation between the posture of the user, the precise location of the user, and the field of view surrounding the user. Therefore, behavioral analytics program 200 does not identify inconsistencies in the behavior of the user and the environment in which the user is located, and behavioral analytics program 200 allows access to restricted application functions of application software 122A and proceeds to step 212. In another embodiment, behavioral analytics program 200 determines the field of view, postural, and positional data correlate with the insights (e.g., verifies secondary authentication based on correlation), and behavioral analytics program 200 grants access. In an alternate embodiment, behavioral analytics program 200 may perform steps 218 and 220 prior to step 210 (e.g., issues a challenge and determined whether a valid response occurs). If behavioral analytics program 200 determines receipt of a valid response to the issued challenge (e.g., two factor authentication occurs through correct login with password and user passes issued challenge), then behavioral analytics program 200 grants access.

In step 212 behavioral analytics program 200 records client device 110, application software 122A or application software 122B, postural, positional, and field of view data within activity analysis repository 124. In one embodiment, behavioral analytics program 200 determines application software 122A or application software 122B is not present within activity analysis repository 124. Behavioral analytics program 200 creates a new entry to record the client device 110, postural, positional, and field of view data for future comparison and creation of insights for subsequent access requests through application software 122A. In another embodiment, behavioral analytics program 200 identifies entries for application software 122A within activity analysis repository 124. Behavioral analytics program 200 stores the client device 110 postural, positional, and field of view data within activity analysis repository 124 within the entry associated with the applications software. Additionally, in some other embodiment, behavioral analytics program 200 stores client device 110, postural, positional, and field of view data within activity analysis repository 124 within sub-categories based on one or more matches and/or tolerances with prior instances of client device 110, postural, positional, and field of view data. For example, behavioral analytics program 200 stores the data within a sub-category based on a device type (e.g., user access application software 122A with a laptop, a mobile phone, and a tablet). Behavioral analytics program 200 updates previously calculated insights based on the newly recorded data stored within activity analysis repository 124 to determine future access requests. Additionally, behavioral analytics program 200 continues to add entries to activity analysis repository 124 over time each time the user access application software 122A. For example, behavioral analytics program 200 stores all the actions and activities performed (e.g., authenticated and non-authenticated tasks) by a user of application software 122A within activity analysis repository 124 for development of additional insights.

In some embodiments at the conclusion of step 212, behavioral analytics program 200 repeats the method for each action performed while the user is accessing software application 122A to detect changes within the field of view, postural, and positional data for inconsistencies that would alter user access. For example, the user completes a transaction to pay the bill in a home office, which behavioral analytics program 200 correlates with insights (e.g., allows access). However upon completion, the user moves from the office to the kitchen and requests to pay a second bill. Behavioral analytics program 200 repeats the process to determine whether paying the second bill from the kitchen is included within the insights prior to behavioral analytics program 200 allowing the user to pay the second bill. Additionally, behavioral analytics program 200 improves insights and correlations as behavioral analytics program 200 adds entries to activity analysis repository 124 (e.g., increases the number of observable experiences from which behavioral analytics program 200 creates insights).

In step 214 behavioral analytics program 200 applies restrictions to user activity and allows restricted access. Behavioral analytics program 200 allows restricted access to the user (e.g., limits the information the user has access to and/or to functions the user may perform). Behavioral analytics program 200 locks-out functions that require additional authentication to perform (e.g., does not initiate a function upon selection, a function is unable to be selected, prompts a user for additional information prior to execution of a function, etc.). For example, the user enters login credentials to Bank ABC through user interface 112 that are verified, however, behavioral analytics program 200 determines the posture, field of view, and precise location of the user do not form correlations with the stored insights for the functions to pay a bill and transfer funds. Behavioral analytics program 200 allows the user access to view account balances, but prohibits the user from transferring funds. In some embodiments, behavioral analytics program 200 applies additional restrictions to user activity after behavioral analytics program 200 determines the challenge response is invalid (no branch, decision 220). For example, the user enters an incorrect answer to the challenge question of "What street did you live on when you were in grade school?" and behavioral analytics program 200 logs out of the Bank ABC account and requests the user resubmit login credentials.

In decision 216 behavioral analytics program 200 determines whether the user requests access to restricted functions. Behavioral analytics program 200 monitors user activities and selections associated with application software 122A. If behavioral analytics program 200 determines the user requests access to restricted functions (decision 216, yes branch), then behavioral analytics program 200 issues a challenge (step 218). Continuing the example, as behavioral analytics program 200 allows restricted access (e.g., limited access) to Bank ABC, the user navigates between unrestricted functions to view activity for a checking account, a savings account, and a credit card statement (e.g., performs three separate selections of unrestricted functions that are allowed). However, behavioral analytics program 200 then determines the user selects an option to enter a new online bill and subsequently process payment (e.g., transfer funds), which is a restricted function that is locked (e.g., unable to be accessed and/or performed by the user with restrictions in place). Behavioral analytics program 200 issues a challenge (step 218) to allow the user an opportunity to unlock the account (e.g., remove restrictions), thereby allowing the user to perform the restricted function provided the challenge is answered correctly. If behavioral analytics program 200 determines the user does not request access to restricted functions (decision 216, no branch), then behavioral analytics program 200 returns and monitors the actions of the user until user requests access to restricted functions (decision 216) or the user ends (e.g., exits, logs off, etc.) application software 122A or application software 122B.

In step 218 behavioral analytics program 200 issues a challenge. Challenges are a family of protocols in which a question is presented that the user provides an expected response for authentication. Behavioral analytics program 200 displays a request for additional information (e.g., biometrics, answer a predefined question, entry of a code delivered to a trusted device, etc.). For example, client device 110 includes a fingerprint scanner. Behavioral analytics program 200 requests the users submit a fingerprint scan to unlock the additional functionality. Behavioral analytics program 200 receives a scan through the fingerprint scanner for comparison with stored fingerprints to determine whether the response is valid.

In decision 220 behavioral analytics program 200 determines whether a received response is valid. Behavioral analytics program 200 receives a response (e.g., answer) from the user to utilize for authentication. Behavioral analytics program 200 compares the received response with expected responses. For example, behavioral analytics program 200 generates a random passphrase (e.g., combination of alphanumeric characters). Behavioral analytics program 200 send the passphrase to a registered method of contact (e.g., e-mail account, text message to client device 110, calls a stored home phone number, etc.). Behavioral analytics program 200 receives submission of the passphrase through the submission box through which behavioral analytics program 200 issued the challenge. Behavioral analytics program 200 compares the received passphrase from the user with the expected generated passphrase that was sent to determine whether the passphrases match. If behavioral analytics program 200 determines the received response is valid (decision 220, yes branch), then behavioral analytics program 200 records client device 110, application software 122A or application software 122B, postural, positional, and field of view data (step 210). If behavioral analytics program 200 determines the received response is not valid (decision 220, no branch), then behavioral analytics program 200 applies restrictions to user activity (step 214).

Figure 3:
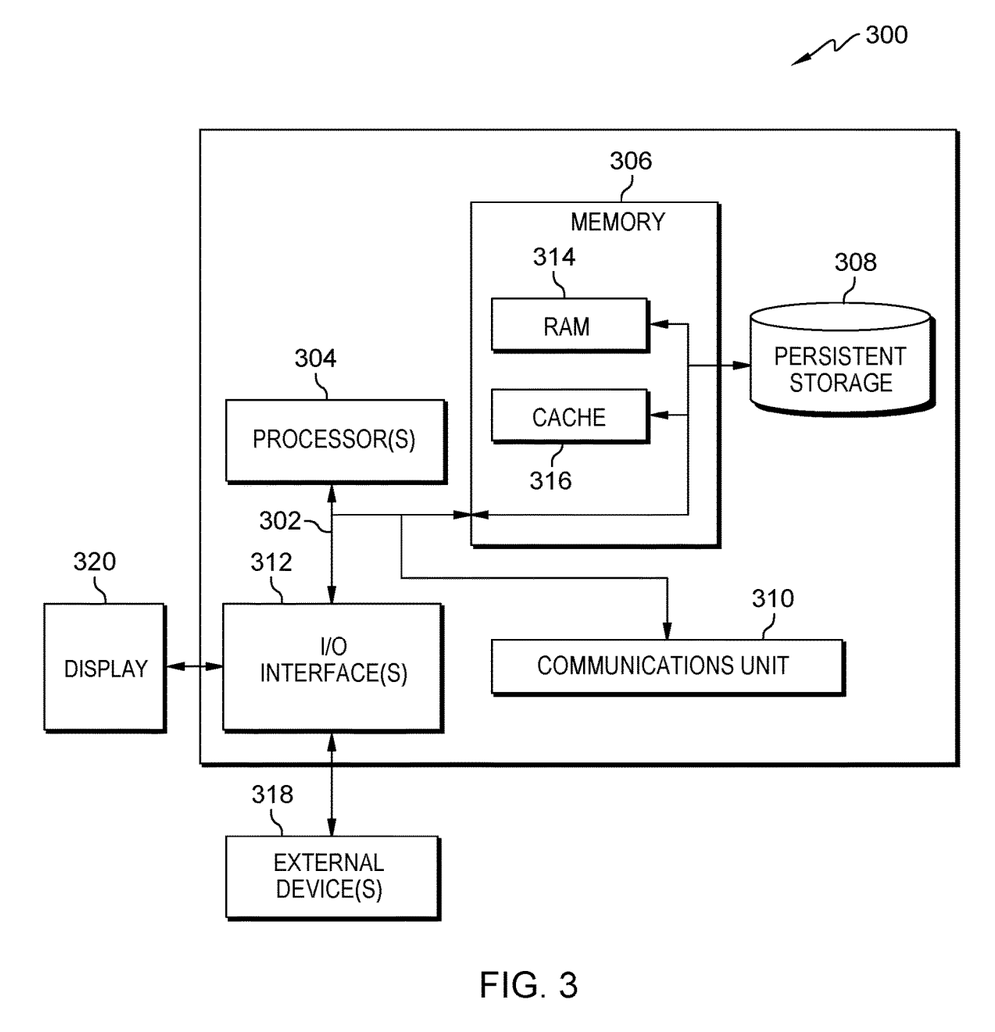
FIG. 3 is a block diagram of components of the proxy server computer executing the behavioral analytics program, in accordance with an embodiment of the present invention.

FIG. 3 depicts a block diagram of components of server 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, application software 122A, application software 122B, activity analysis repository 124, and behavioral analytics program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, application software 122A, application software 122B, activity analysis repository 124, and behavioral analytics program 200 may be downloaded to persistent storage 308 through communications unit 310.

I/O interface(s) 312 allows for input and output of data with other devices that may be connected to server 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, application software 122A, application software 122B, activity analysis repository 124, and behavioral analytics program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
    identifying, by one or more computer processors, a user attempting to access information that requires authentication approval via a computing device;
    receiving, by the one or more computer processors, one or more digital images from the computing device;
        determining, by the one or more computer processors, a current field of view of the computing device based on the received one or more digital images;
        determining, by the one or more computer processors, a current location of the user;
        determining, by the one or more computer processors, a current posture of the user;
    determining, by the one or more computer processors, whether at least one of the current field of view, the current location, and the current posture during a current attempt to access information matches one or more of a previous field of view of the computing device, a previous location of the user, and a previous posture of the user during a previous attempt to access the information; and
    based on the determination, performing, by the one or more computer processors, an action related to the user accessing the information.

2. The method of claim 1, wherein determining the current field of view of the computing device based on the received one or more digital images further comprises:
    identifying, by the one or more computer processors, one or more objects within the one or more digital images based on image processing, pattern recognition, digital geometry, and object-based image analysis;
    determining, by the one or more computer processors, a frame of reference, wherein the frame of reference measures a precise location of the user within the current field of view relative to the identified one or more objects; and
    storing, by the one or more computer processors, the identified one or more objects and the determined frame of reference within a repository.

3. The method of claim 1, wherein determining the current posture of the user further comprises:
    receiving, by the one or more computer processors, a first set of sensor data from the computing device;
    determining, by the one or more computer processors, a position of the computing device based on the received first set of sensor data;
    calculating, by the one or more computer processors distances to one or more objects within the determined current field of view; and
    determining, by the one or more computer processors the current posture of the user based on the determined position of the computing device and the calculated distances to the one or more objects within the determined current field of view.

4. The method of claim 1, wherein determining the current location of the computing device further comprises:
    receiving, by the one or more computer processors, a first location of the computing device based on a global positioning system;
    receiving, by the one or more computer processors, a second location of the computing device based on an indoor positioning system; and
    determining, by the one or more computer processors, a precise location based on combining the received first location and the received second location.

5. The method of claim 1, wherein determining, whether at least one of the current field of view, the current location, and the current posture during the current attempt to access information matches one or more of a previous field of view of the computing device, a previous location of the user, and a previous posture of the user during a previous attempt to access the information further comprises:
    determining, by the one or more computer processors, a number of entries that match the user attempt to access information;
    determining, by the one or more computer processors, whether the determined number of entries are above a threshold;
    responsive to determining the determined number of entries are above the threshold, determining, by the one or more processors, a confidence level for the determined number of entries for the previous field of view of the computing device, the previous location of the user, and the previous posture of the user; and
    determining access, by the one or more computer processors, based on a comparison of the at least one of the current field of view, the current location, and the current posture to the determined confidence level.

6. The method of claim 3, further comprising:
    receiving, by the one or more computer processors, a second set of sensor data from a smart watch;
    combining, by the one or more computer processors, the first set of sensor data and the second set of sensor data; and
        determining, by the one or more computer processors, the current posture based on the combined first set of sensor data and the second set of sensor data and the calculated distances to the one or more objects within the determined current field of view.

7. The method of claim 1, wherein determining the number of entries that match the user attempt to access information; further comprises selecting, by the one or more computer processors, the entries within the repository that includes: the tracked action by the user, the information that requires authentication approval, the computing device, the determined field of view, the determined location, and the determined posture.

8. The method of claim 1, further comprises:
    storing, by the one or more computer processors, actions performed by the user, an identity of the computing device, the current field of view, the determined current location, and the determined current posture within a repository, wherein the repository includes fields of view, locations of the user, and postures of the users associated with accessing information that requires authentication from one or more separate user attempts to access information that required authentication that were allowed.

9. A computer program product for determining access the computer program product comprising:
    one or more computer readable storage media and program instructions stored on the one or more computer readable storage media, the program instructions comprising:

program instructions to identify a user attempting to access information that requires authentication approval via a computing device;
program instructions to receive one or more digital images from the computing device;
   program instructions to determine a current field of view of the computing device based on the received one or more digital images;
   program instructions to determine a current location of the user;
   program instructions to determine a current posture of the user;
program instructions to determine whether at least one of the current field of view, the current location, and the current posture during a current attempt to access information matches one or more of a previous field of view of the computing device, a previous location of the user, and a previous posture of the user during a previous attempt to access the information; and
based on the determination, program instructions to perform an action related to the user accessing the information.

10. The computer program product of claim 9, wherein determining the current field of view of the computing device based on the received one or more digital images further comprises the program instructions, stored on the one or more computer readable storage media, to:
   identify one or more objects within the one or more digital images based on image processing, pattern recognition, digital geometry, and object-based image analysis;
   determine a frame of reference, wherein the frame of reference measures a precise location of the user within the current field of view relative to the identified one or more objects; and
store the identified one or more objects and the determined frame of reference within a repository.

11. The computer program product of claim 9, wherein determining the current posture of the user further comprises the program instructions, stored on the one or more computer readable storage media, to:
   receive a first set of sensor data from the computing device;
   determine a position of the computing device based on the received first set of sensor data;
   calculate distances to one or more objects within the determined current field of view; and
   determine the current posture of the user based on the determined position of the computing device and the calculated distances to the one or more objects within the determined current field of view.

12. The computer program product of claim 9, wherein determining the current location of the computing device further comprises the program instructions, stored on the one or more computer readable storage media, to:
   receive a first location of the computing device based on a global positioning system;
   receive a second location of the computing device based on an indoor positioning system; and
   determine a precise location based on combining the received first location and the received second location.

13. The computer program product of claim 9, wherein determining, whether at least one of the current field of view, the current location, and the current posture during the current attempt to access information matches one or more of a previous field of view of the computing device, a previous location of the user, and a previous posture of the user during a previous attempt to access the information further comprises the program instructions, stored on the one or more computer readable storage media, to:
   determine a number of entries that match the user attempt to access information;
   determine whether the determined number of entries are above a threshold;
   responsive to determining the determined number of entries are above the threshold, determine a confidence level for the determined number of entries for the previous field of view of the computing device, the previous location of the user, and the previous posture of the user; and
determine based on a comparison of the at least one of the current field of view, the current location, and the current posture to the determined confidence level.

14. The computer program product of claim 11, further comprising the program instructions, stored on the one or more computer readable storage media, to:
   receive a second set of sensor data from a smart watch;
   combine the first set of sensor data and the second set of sensor data; and
      determine the current posture based on the combined first set of sensor data and the second set of sensor data and the calculated distances to the one or more objects within the determined current field of view.

15. The computer program product of claim 9, wherein determining the number of entries that match the user attempt to access information; further comprises the program instructions, stored on the one or more computer readable storage media, to:
   select the entries within the repository that includes: the tracked action by the user, the information that requires authentication approval, the computing device, the determined field of view, the determined location, and the determined posture.

16. The computer program product of claim 9, further comprises the program instructions, stored on the one or more computer readable storage media, to:
   store actions performed by the user, an identity of the computing device, the current field of view, the determined current location, and the determined current posture within a repository, wherein the repository includes fields of view, locations of the user, and postures of the users associated with accessing information that requires authentication from one or more separate user attempts to access information that required authentication that were allowed.

17. A computer system for determining access the computer program product comprising:
   one or more computer processors;
   one or more non-transitory computer readable storage media;
      program instructions stored on the one or more computer readable storage media for execution by at least one of the one or more computer processors, the program instructions comprising:
   program instructions to identify a user attempting to access information that requires authentication approval via a computing device;
   program instructions to receive one or more digital images from the computing device;
      program instructions to determine a current field of view of the computing device based on the received one or more digital images;
      program instructions to determine a current location of the user;

program instructions to determine a current posture of the user;

program instructions to determine whether at least one of the current field of view, the current location, and the current posture during a current attempt to access information matches one or more of a previous field of view of the computing device, a previous location of the user, and a previous posture of the user during a previous attempt to access the information; and based on the determination, program instructions to perform an action related to the user accessing the information.

18. The computer system of claim 17, wherein determining the current field of view of the computing device based on the received one or more digital images further comprises the program instructions, stored on the one or more computer readable storage media, to:

identify one or more objects within the one or more digital images based on image processing, pattern recognition, digital geometry, and object-based image analysis;

determine a frame of reference, wherein the frame of reference measures a precise location of the user within the current field of view relative to the identified one or more objects; and store the identified one or more objects and the determined frame of reference within a repository.

19. The computer system of claim 17, wherein determining the current posture of the user further comprises the program instructions, stored on the one or more computer readable storage media, to:

receive a first set of sensor data from the computing device;

determine a position of the computing device based on the received first set of sensor data;

calculate distances to one or more objects within the determined current field of view; and determine the current posture of the user based on the determined position of the computing device and the calculated distances to the one or more objects within the determined current field of view.

20. The computer system of claim 17, wherein determining the current location of the computing device further comprises the program instructions, stored on the one or more computer readable storage media, to:

receive a first location of the computing device based on a global positioning system;

receive a second location of the computing device based on an indoor positioning system; and determine a precise location based on combining the received first location and the received second location.

* * * * *